United States Patent
Nagatsuma et al.

(10) Patent No.: US 7,430,422 B2
(45) Date of Patent: Sep. 30, 2008

(54) POSITION INFORMATION NOTIFYING METHOD AND DEVICE

(75) Inventors: Junko Nagatsuma, New York, NY (US); Hiroyuki Yamamoto, Tokyo (JP); Yoichi Tanibayashi, Fujisawa (JP); Kazunori Kosuge, Yokohama (JP); Katsutoshi Murata, Kunitachi (JP)

(73) Assignee: NTT DoCoMo, Inc., Tokyo (JP)

( * ) Notice: Subject to any disclaimer, the term of this patent is extended or adjusted under 35 U.S.C. 154(b) by 66 days.

(21) Appl. No.: 10/296,293

(22) PCT Filed: Feb. 4, 2002

(86) PCT No.: PCT/JP02/00881

§ 371 (c)(1),
(2), (4) Date: Nov. 21, 2002

(87) PCT Pub. No.: WO02/063906

PCT Pub. Date: Aug. 15, 2002

(65) Prior Publication Data

US 2003/0129994 A1 Jul. 10, 2003

(30) Foreign Application Priority Data

Feb. 2, 2001 (JP) ............................. 2001-27512

(51) Int. Cl.
*H04Q 7/20* (2006.01)
(52) U.S. Cl. .................. 455/456.3; 455/457
(58) Field of Classification Search ............. 455/423, 455/425, 456.1, 457, 414.1, 418, 445, 422.1, 455/426.2, 435.1, 435.2, 454, 456.5, 461, 455/412.1, 404, 567, 426, 419, 456.3; 379/45, 379/37
See application file for complete search history.

(56) References Cited

U.S. PATENT DOCUMENTS

| 6,163,701 A | 12/2000 | Saleh et al. ........... 455/456 |
| 6,236,365 B1* | 5/2001 | LeBlanc et al. ........ 342/457 |
| 6,741,853 B1* | 5/2004 | Jiang et al. ........... 455/418 |
| 2002/0193109 A1* | 12/2002 | Kobayashi et al. ...... 455/430 |
| 2003/0069002 A1* | 4/2003 | Hunter et al. ......... 455/404 |
| 2003/0190911 A1* | 10/2003 | Hirano ............... 455/423 |
| 2004/0058683 A1* | 3/2004 | Okagawa et al. ....... 455/445 |
| 2004/0102196 A1* | 5/2004 | Weckstrom et al. ... 455/456.1 |
| 2004/0111640 A1* | 6/2004 | Baum ................. 713/201 |
| 2004/0184584 A1* | 9/2004 | McCalmont et al. ...... 379/45 |
| 2004/0203891 A1* | 10/2004 | Cole et al. ......... 455/456.1 |
| 2004/0203902 A1* | 10/2004 | Wilson et al. ....... 455/456.1 |
| 2004/0207513 A1* | 10/2004 | Nageli .............. 340/7.21 |

FOREIGN PATENT DOCUMENTS

| EP | 0 851 696 A2 | 7/1998 |
| EP | WO 00/07404 | 2/2000 |
| GB | 2 322 248 A | 7/1997 |

(Continued)

*Primary Examiner*—Naghmeh Mehrpour
(74) *Attorney, Agent, or Firm*—Brinks Hofer Gilson & Lione

(57) ABSTRACT

Location information providing unit of gateway server 40 obtains location information on cellular telephone 10, 20 and 30 each produced in different expression format from measuring center 50, converts obtained location information into expression formats which IP server 80A and IP server 80B can deal with via location information converting device 60, and notifies converted location information to IP server 80A and 80B. As a result, IP server 80A and 80B can obtain location information on each cellular telephone 10, 20, and 30 without experiencing any difficulty.

30 Claims, 16 Drawing Sheets

FOREIGN PATENT DOCUMENTS

| | | |
|---|---|---|
| JP | 4-168317 | 6/1992 |
| JP | 8-107583 | 4/1996 |
| JP | 8-126060 | 5/1996 |
| JP | H10-170625 | 6/1998 |
| JP | H11-331937 | 11/1999 |
| JP | 2000-503503 | 3/2000 |
| JP | 2000-349917 | 12/2000 |
| JP | 2001-78273 | 3/2001 |
| JP | 2001-103537 | 4/2001 |
| JP | 2001-320340 | 11/2001 |
| JP | 2002-232600 | 8/2002 |
| WO | WO 99/05877 A1 | 2/1999 |

* cited by examiner

*FIG. 4*

| BASE STATION ID | IP SERVER 80A | IP SERVER 80B | ...... |
|---|---|---|---|
| BS001 | X, Y | 1-1-1 TORANOMON MINATO-KU | ...... |
| ⋮ | ⋮ | ⋮ | |

| AREA ID | IP SERVER 80A | IP SERVER 80B | ...... |
|---|---|---|---|
| AREA001 | X, Y | 1-1-1 TORANOMON MINATO-KU | ...... |
| ⋮ | ⋮ | ⋮ | |

| SECTOR ID | IP SERVER 80A | IP SERVER 80B | · · · · · |
|---|---|---|---|
| SEC001 | X, Y | 1-1-1 TORANOMON MINATO-KU | · · · · · |
| ⋮ | ⋮ | ⋮ | |

| OBJECTS FOR PROVIDING LATITUDE AND LONGITUDE |
|---|
| IP SERVER 80A |
| IP SERVER 80F |
| IP SERVER 80K |
| ⋮ |

FIG. 11

| OBJECTS FOR PROVIDING LOCATION INFORMATION | MAIN UNIT REQUESTING LOCATION INFORMATION | TIME WHEN NOTIFICATION STARTS | TIME WHEN NOTIFICATION ENDS | NOTIFICATION CYCLE | NOTIFICATION FLAG |
|---|---|---|---|---|---|
| CELLULAR TELEPHONE 30 | IP SERVER 80B | 9:00 | 17:00 | 1 MINUTE | ON |
| CELLULAR TELEPHONE 20 | IP SERVER 80A | 0:00 | 0:00 | 30 MINUTES | OFF |
| ... | ... | ... | ... | ... | ... |
| ... | ... | ... | ... | ... | ... |
| ... | ... | ... | ... | ... | ... |
| ... | ... | ... | ... | ... | ... |
| ... | ... | ... | ... | ... | ... |

40c

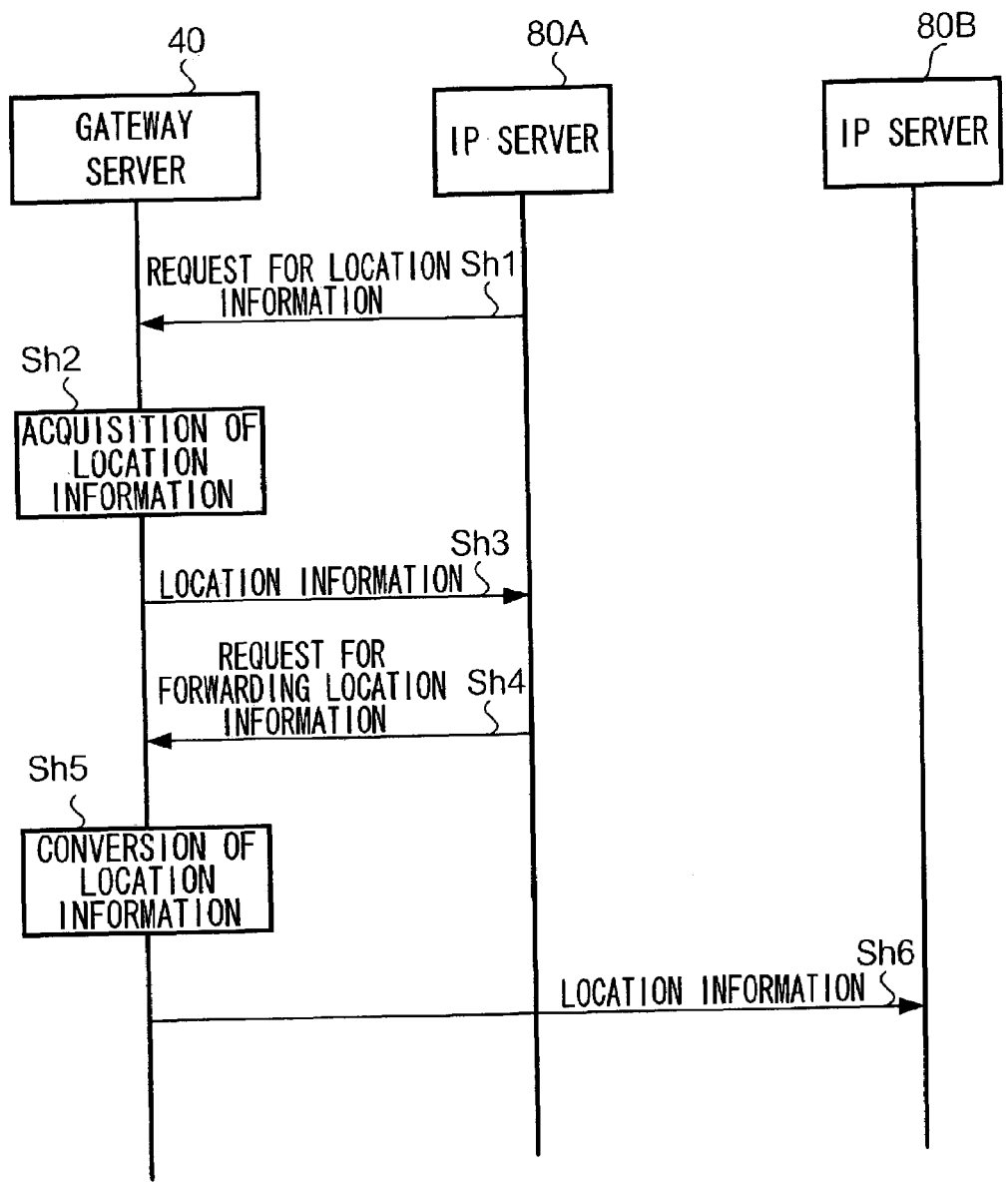

POSITION INFORMATION NOTIFYING METHOD AND DEVICE

TECHNICAL FIELD

The present invention relates to some methods for notifying location information and location information notification devices to notify location information on mobile communication terminals.

BACKGROUND ART

Mobile communication networks such as cellular telephones and so forth, can detect the current location of mobile communication terminals. In recent years, several kinds of systems, which perform information providing services by using location information obtained by these types of mobile communication networks, are proposed.

For instance, in PHS (Personal Handy Phone System) networks, it is possible to detect, within the radio zone of which base station a mobile communication terminal currently exists; and the system for providing a location chase service by using this location information is known.

Also systems which use location information obtained by installing GPS (Global Positioning System) in mobile communication terminals are suggested.

Incidentally, expression formats of location information obtained on a mobile communication terminal differ according to the method adopted for location detection by the mobile communication terminal. For instance, in the above mentioned PHS network, the expression format is that of identification information (hereafter, referred to as the base station ID) for identifying the base station which administers the radio zone in which the mobile communication terminal is located; and in GPS, the expression format of location information is in the latitude-longitude format obtained by measuring the location of the mobile communication terminal.

Also in computer systems, which provide various services by using location information, formats for expressing the requested location information differ.

For instance, a computer system may want to deal with location information expressed in the expression format of latitude-longitude, and alternatively, the computer system may want to deal with location information expressed in the format of a province.

As long as expression formats of location information vary depending on the mobile communication network or the computer system in use, it is not possible to provide a service which corresponds to the integration of various networks; a need which is about to develop rapidly.

DISCLOSURE OF INVENTION

The present invention was developed to overcome the problems of the above-mentioned prior art. To provide a common platform for location information provision in accordance with the integration of networks, the object is to provide the location information notification method and a device, which can provide location information on mobile communication terminals, obtained in various expression formats in the expression format each computer system, which uses location information, can deal with.

The configuration of the present invention comprises a location information producing step for detecting the location of a mobile communication terminal belonging to a mobile communication network performing radio communication and producing location information;

a location information converting step for converting location information which was produced in the location information producing step, to an expression format compatible with a particular computer among a plurality of computers which can deal with location information expressed in each inherent expression format, into location information expressed in the format which the computer can deal with; and a location information notification step for notifying the computer of location information obtained in the location information converting step.

Also, another configuration of the present invention comprises an error notification step for notifying the computer of an error in producing location information when location information could not be produced in the location information producing step.

Also, another configuration of the present invention is characterized by the ability to carry out periodically and repeatedly, the location information producing step, the location information converting step, and the location information notification step.

Also, another configuration of the present invention comprises a forwarding request receiving step for receiving, along with the location information, a request for forwarding the location information from the computer, which received notification of the location information to another computer;

a converting step for converting the received location information into an expression format which the other computer can deal with; and a forwarding step for notifying the other computer of the location information whose expression format was converted.

Also, another configuration of the present invention comprises a location information producing step for detecting the location of a mobile communication terminal and producing its location information;

a location information converting step, for converting location information produced in the location information producing step into expression formats compatible with each of the computers from the expression format in which the location information was produced, when notifying a plurality of computers;

a location information transmitting step for transmitting, to the above mentioned plurality of computers, location information on a plurality of kinds converted into each of the expression formats.

Also, another configuration of the present invention comprises a request receiving step for receiving a notice request from the first computer for notifying a location information to a second computer among a plurality of computers with varying expression format compatibilities;

a location information producing step for detecting the location of a mobile communication terminal and producing its location information;

a location information converting step for converting the location information produced in the location information producing step into location information in an expression format, which the second computer can deal with; and a location information notification step for notifying the second computer of location information converted into an expression format compatible with the second computer.

Also, another configuration of the present invention comprises a location information producing means for detecting the location of a mobile communication terminal belonging to a mobile communication network performing radio communication, and producing location information;

a location information converting means for converting location information produced by the location information producing means, for one computer among a plurality of computers having varying expression format compatibilities into location information in an expression format which the computer can deal with; and a location information notification means for notifying a computer of location information obtained by the location information converting means.

Also, another configuration of the present invention comprises an error notification means for notifying a computer of an error in producing location information when location information could not be produced by the location information producing means.

Also, another configuration of the present invention comprises a forwarding request receiving means for receiving, along with the location information, a request for forwarding the location information to another computer from the computer, which received notification of the location information;

a converting means for converting the received location information into an expression format which the other computer can deal with; and a forwarding means for notifying the other computer of the location information whose expression format was converted.

Also, another configuration of the present invention comprises a location information producing means for detecting the location of a mobile communication terminal and producing its location information;

a location information converting means for converting location information from the expression format in which it was produced by the location information producing means into expression formats compatible with each computer, when the location information is notified to a plurality of computers;

a location information transmitting means for transmitting location information on a plurality of kinds converted into each expression format to a plurality of computers.

Also, another configuration of the present invention comprises a request receiving means for receiving a notice request from the first computer for notifying the location information to a second computer among a plurality of computers, which can deal with location information expressed in each inherent expression format;

a location information producing means for detecting the location of a mobile communication terminal and producing its location information;

a location information converting means for converting the location information produced by the location information producing means into location information in an expression format which the second computer can deal with; and a location information notification means for notifying the second computer of location information converted into an expression format of the second computer.

BRIEF DESCRIPTION OF DRAWINGS

FIG. 4 is a format diagram showing an example of the conversion table for simple cellular telephone network 12 of the first embodiment.

FIG. 5 is a format diagram showing an example of the conversion table for cellular telephone network 22 of the first embodiment.

FIG. 6 is a format diagram showing an example of the conversion table for mobile packet communication network 32 of the first embodiment.

FIG. 7 is a format diagram showing an example of a table of objects for providing latitude and longitude of the first embodiment.

FIG. 11 shows an example of the location notification table for performing the location information notification method, which pertains to the third embodiment of the present invention.

FIG. 19 is a sequence diagram showing an example of an operation in the sixth embodiment.

PREFERRED MODE OF CARRYING OUT THE INVENTION

[1] Embodiments of the Invention

[1.1] First Embodiment

The first embodiment of the present invention will now be described.

Figure 1:
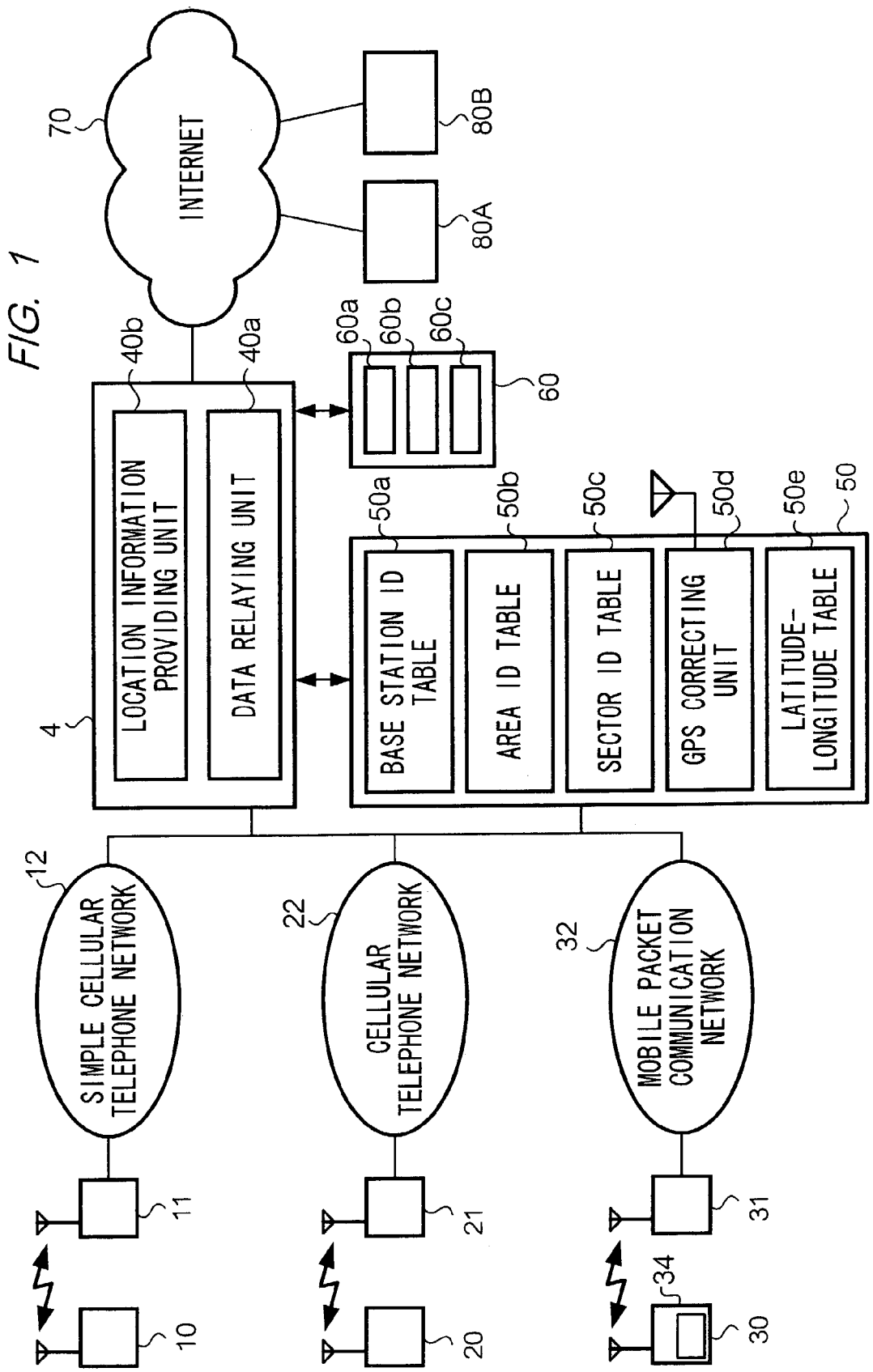
FIG. 1 is a block diagram showing the configuration of the entire network, which executes the location information notification method pertaining to the first embodiment of the present invention.

[1.1.1] Configuration of the First Embodiment (1) Entire Configuration of the Network FIG. 1 is a block diagram showing the entire configuration of the network of the first embodiment. In this figure, 10 is a simple cellular telephone which is called PHS (Personal Handy Phone System) belonging to simple cellular telephone network 12. Simple cellular telephone 10 performs radio communication with base station 11 of simple cellular telephone network 12, and receives the telephone call service provided by network 12.

20 is a cellular telephone belonging to cellular telephone network 22 such as PDC (Personal Digital Cellular). Cellular telephone 20 performs radio communication with base station 21 of cellular telephone network 22, and can receive the telephone call service provided by network 22.

The above mentioned simple cellular telephone network 12 and cellular telephone network 22 are connected via a gateway device (not shown), and can communicate with each other.

30 is a cellular telephone belonging to mobile packet communication network 32. Cellular telephone 30 performs radio communication with base station 31 of mobile packet communication network 32, and can receive the packet communication service provided by network 32.

Cellular telephone 30 is equipped with GPS (Global Positioning System) receiver 34. GPS receiver 34 receives a GPS signal from GPS satellite (not shown) as GPS measurement value, and on the basis of which GPS receiver 34 detects the latitude and longitude of the location of cellular telephone 30 into which GPS receiver 34 is installed.

In the descriptions below, when referring to simple cellular telephone 10, cellular telephone 20, and cellular telephone 30 collectively, they will be abbreviated as 10, 20, and 30 respectively. Similarly, when referring to simple cellular telephone network 12, cellular telephone network 22, and mobile packet communication network 32 collectively, they will be abbreviated as 12, 22 and 32 respectively.

40 is a gateway server and relays data communication between mobile packet communication network 32 and Internet 70. Gateway server 40 is equipped with data relaying unit 40*a* for relaying data communication and location information providing unit 40*b* for providing location information on each of the cellular telephones 10, 20, and 30 to IP (Information Provider) servers 80A, 80B and so forth, which are connected to internet 70. Also, location information providing unit 40*b* is equipped with a table of objects for providing latitude and longitude (not shown), which will be described later.

50 is a measuring center which obtains and stores location information on each of the cellular telephones 10, 20 and 30.

For instance, simple cellular telephone network 12 can detect in which radio zone of base station 11 each simple cellular telephone 10 currently exists. Measuring center 50 obtains the detection result from simple cellular telephone network 12, and stores it in base station ID table 50*a* by correlating the identification information on each simple cellular telephone 10 and the identification information on base station 11 (in other words, the base station ID) in which each of the simple cellular telephone 10 is located.

Also, cellular telephone network 22 can detect the service area in which each cellular telephone 20 is currently located. The service area is the domain defined by the radio zone of a designated number of base stations 21. Measuring center 50 obtains the detection result from cellular telephone network 22, and stores it in area ID table 50*b* by correlating the identification information on each cellular telephone 20 and the identification information on the service area in which each cellular telephone 20 is located.

Also, mobile packet communication network 32 can detect the sector of the radio zone of base station 31 in which each cellular telephone 30 is currently located. The sector is the partial domain of a radio zone, which is divided by the directional antenna of base station 31. Measuring center 50 obtains the detection result from mobile packet communication network 32, and by correlating the identification information on each cellular telephone 30 and the identification information on the sector in which each cellular phone 30 is located, stores the correlated identification information in sector ID table 50*c*.

Also, measuring center 50 is equipped with GPS correcting unit 50*d* which corrects GPS measurement value of cellular telephone 30 by D (Differential)-GPS method; and latitude-longitude table 50*e* which stores the correcting result.

GPS correcting unit 50*d* obtains GPS measurement value calculated by cellular telephone 30 via mobile packet communication network 32, and corrects the above-mentioned GPS measurement value based upon GPS measurement difference pre-stored by the unit. The latitude-longitude information obtained as a result of this correction is the information, which shows more precisely the location of cellular telephone 30. Measuring center 50 correlates the obtained latitude-longitude information with the identification information on cellular telephone 30, and stores the correlated information in latitude-longitude table 50*e*.

Thus, the location information on each of the cellular telephones 10, 20, and 30 is obtained in each different expression format from each of the networks 12, 22 and 32.

60 is the location information converting device for converting the location information on each of the cellular telephones 10, 20 and 30, and stores location information conversion tables 60*a*, 60*b* and 60*c* for converting location information. Location information converting device 60, by referring to location information conversion tables 60*a*, 60*b* and 60*c*, converts the location information on each of the cellular telephones 10, 20 and 30 in different expression formats obtained from each of the networks 12, 22 and 32 into the location information in the expression format which IP server 80A and 80B can deal with.

In other words, because location information converting device 60 is equipped with the function of converting location information, each of the computers such as IP servers 80A or 80B which request the acquisition of location information have the provision of receiving location information on each of the cellular telephones 10, 20 and 30 in any of the various expression formats without experiencing any difficulty. When IP servers 80A and 80B receive the provision of converting the expression format of location information in this manner, they perform the process according to the location information. IP servers 80A and 80B are only two of the many IP servers actually connected with Internet 70.

(2) Configuration of Cellular Telephone 10, 20, and 30

Next, the configuration of cellular telephone 10, 20 and 30 will be explained.

Figure 2:
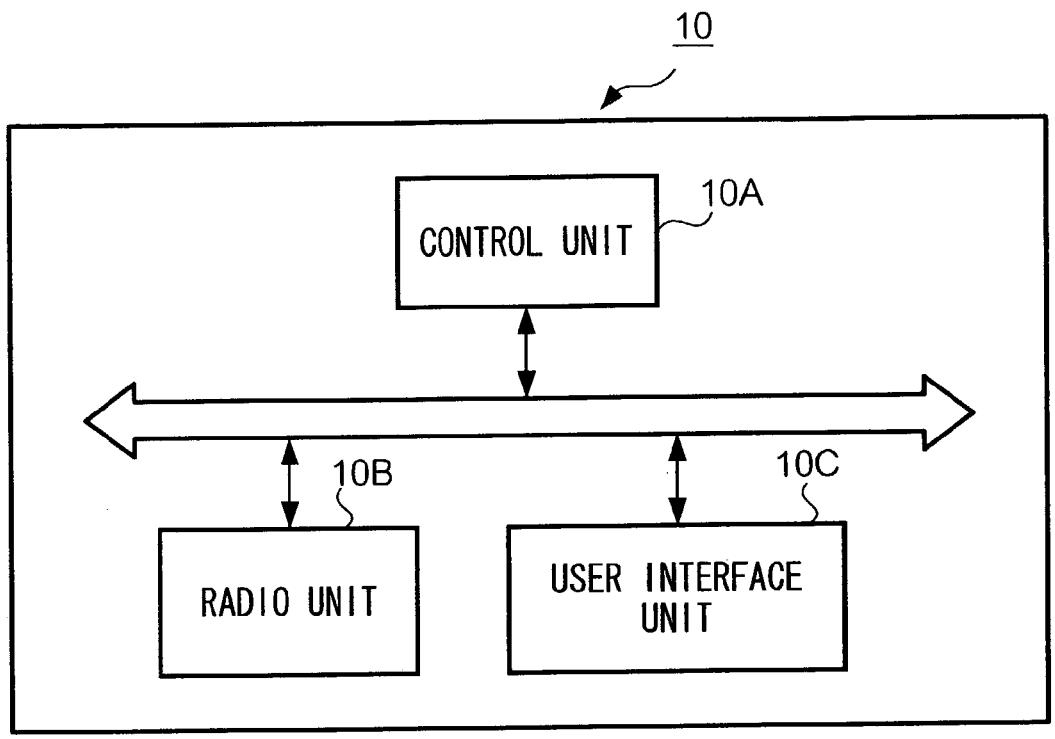
FIG. 2 is a block diagram showing the configuration of the cellular telephone mentioned in the first embodiment.

FIG. 2 is a block diagram showing the configuration of simple cellular telephone 10. In this figure, simple cellular telephone 10 consists of control unit 10A, radio unit 10B and user interface unit 10C by connecting them to each other via a bus.

Control Unit 10A consists of CPU (Central Processing Unit) and several kinds of memories, and controls each unit of simple cellular telephone 10. Radio unit 10B performs radio communication through voice signals and several other kinds of control signals with base station 11, and enables radio communication to take place. User interface unit 10C consists of a microphone and a speaker for providing voice input and output for telephone communication; an operation panel for performing dial operations; and a liquid crystal displaying unit.

The configuration of cellular telephone 20 is different from the configuration of simple cellular telephone 10 shown in FIG. 2 only in that it becomes possible to perform radio communication, by performing communication with base station 21 of cellular telephone network 22; therefore, detailed explanations of the configuration are omitted.

Figure 3:
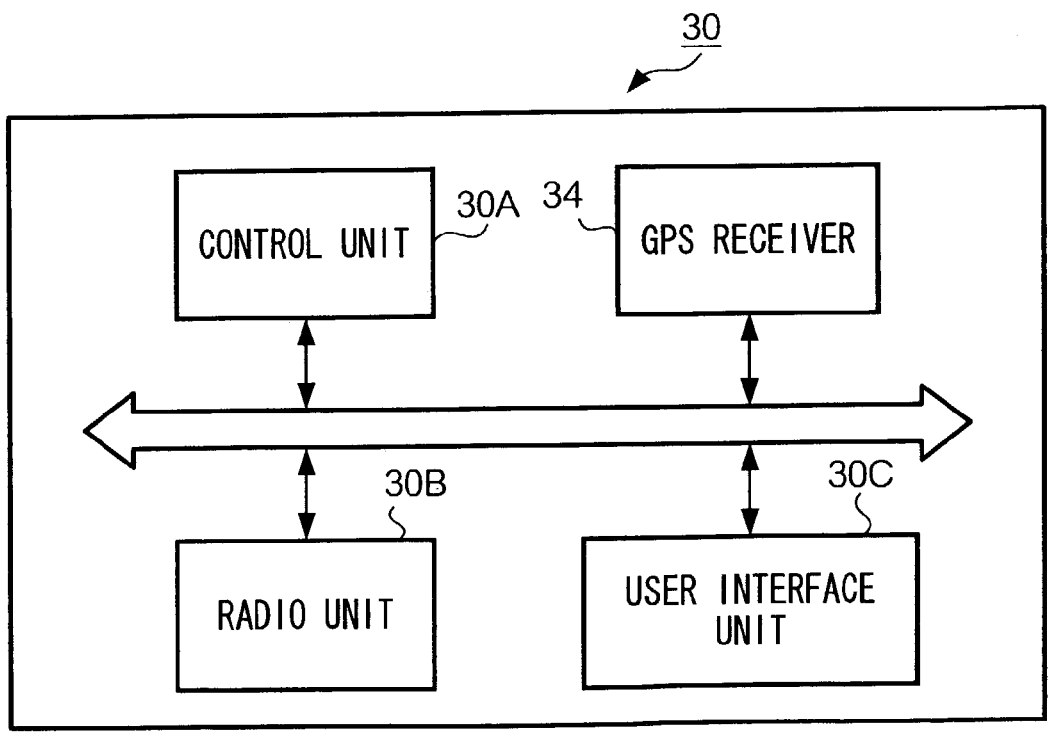
FIG. 3 is a block diagram showing the configuration of the cellular telephone equipped with a GPS receiver mentioned in the first embodiment.

FIG. 3 is a block diagram showing the configuration of cellular telephone 30. In this figure, cellular telephone 30 consists of control unit 30A, radio unit 30B, user interface unit 30C and GPS receiver 34 by connecting these to each other by a bus. Cellular telephone 30 is different from cellular telephones 10 and 20 in that the object of radio communication is not voice communication but packet communication, and it is equipped with GPS receiver 34.

GPS receiver 34, as described above, calculates the latitude and the longitude, which show the location of cellular telephone 30 on the basis of a GPS signal received from GPS satellite (not shown). The latitude and longitude information is transmitted from radio unit 30B as GPS measurement value, and is sent to measuring center 50 via mobile packet communication network 32 as described above. Then the D-GPS correction is performed.

(3) Configuration of Location Information Conversion Table 60a, 60b and 60c

Next, by referring to FIGS. 4, 5, and 6, location information conversion tables 60a, 60b and 60c which location information converting device 60 is equipped with, will be explained.

FIG. 4 is a format diagram showing an example of location information conversion table 60a for simple cellular telephone network 12. As shown in the figure, location information conversion table 60a retains information such as the base station ID in the location information expression format of simple cellular telephone network 12, latitude-longitude (X, Y) which is in the location information expression format computers such as IP servers 80A, 80B and so forth can deal with, a province (Toranomon, Minato-ku) and so forth by correlating these with each other.

FIG. 5 is a format diagram showing an example of location information conversion table 60b for cellular telephone network 22. As shown in this figure, location information conversion table 60b retains information such as the area ID in the location information expression format of cellular telephone network 22, latitude-longitude (X, Y) in the location information expression format which computers such as IP servers 80A, 80B and so forth can deal with, a province (Toranomon, Minato-ku) and so forth, by correlating these with each other.

FIG. 6 is a format diagram showing an example of location information conversion table 60c for mobile packet communication network 32. As shown in this figure, location information conversion table 60c retains information such as the sector ID in the location information expression format of mobile packet communication network 32, latitude-longitude (X, Y) in the location information expression format which computers such as IP servers 80A, 80B and so forth, can deal with, an expression format of a province (Toranomon, Minato-ku) and so forth, by correlating these with each other.

(4) Configuration of Table of Objects for Providing Latitude and Longitude

Next, by referring to FIG. 7, the configuration of the table of objects for providing latitude and longitude which location information providing unit 40b of gateway server 40 is equipped with will be described. FIG. 7 is a format diagram showing an example of the table of objects for providing latitude and longitude. As shown in the figure, the table of objects for providing latitude and longitude retains a list of the IP servers, which can deal with the location information expressed in latitude-longitude. The example of the table of objects for providing latitude and longitude shows, IP servers 80A, IP server 80F (not shown), IP server 80K (not shown) and so forth, recorded as IP servers which can deal with location information expressed in latitude-longitude in the table of objects for providing latitude and longitude.

Location information providing unit 40b, when providing location information to the computers recorded in the table of objects for providing latitude and longitude, directly provides the location information in the latitude-longitude format obtained by referring to the above mentioned latitude-longitude table 50e to the above mentioned computers without a conversion of location information being carried out by location information converting device 60.

[1.1.2] Operations of the First Embodiment

Next, operations of the embodiment of the above mentioned configurations will be explained.

Figure 8:
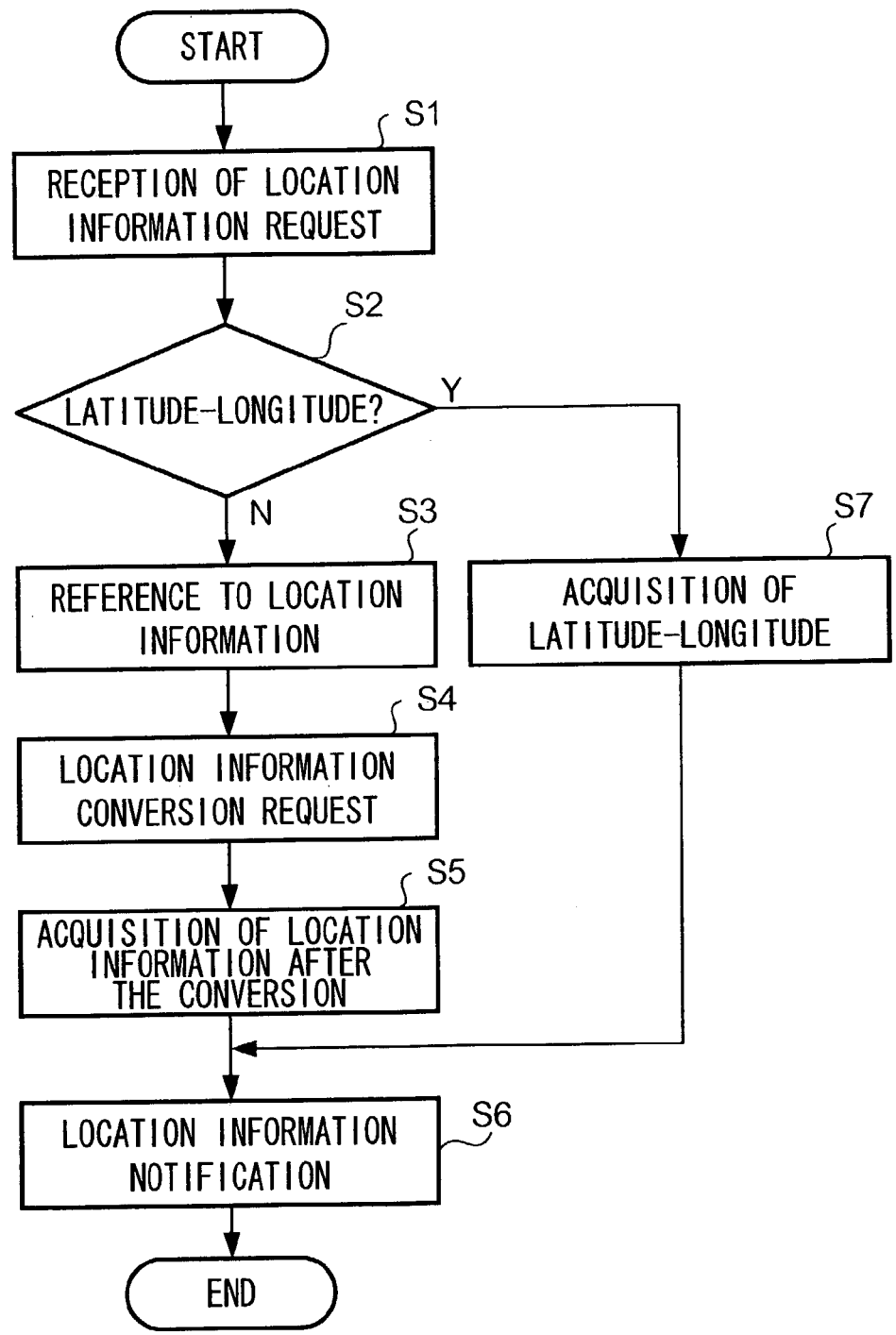
FIG. 8 is a flowchart showing the operation of the location information providing unit of the gateway server of the first embodiment.

FIG. 8 is a flowchart showing operations of location information providing unit 40b of gateway server 40. Hereafter, operations will be explained by referring to the flowchart with an example of notifying the location information on cellular telephone 30 to IP server 80B.

First, as a request signal for obtaining location information on cellular telephone 30 is transmitted to gateway server 40 from IP server 80b, the process of location information providing unit 40b proceeds to Step S1. In Step S1, the above mentioned request signal is received via data relaying unit 40a. Within the request signal are contained, the identification information on IP server 80B which is the main unit of the location information and the identification information on cellular telephone 30 whose location information is requested. Location information providing unit 40b detects the above identification information contained in the request signal.

Then the process of location information providing unit 40b proceeds to Step S2. In Step S2, location information providing unit 40b refers to the table of objects for providing latitude and longitude shown as an example in FIG. 7 with the identification information on IP server 80B contained in the request signal as the search key, and determines whether IP server 80B is listed in the table of objects for providing latitude and longitude. FIG. 7 shows as an example IP server 80B as not being listed in the table of objects; hence, the result of the search carried out in step S2 is "no."

Then the process of location information providing unit 40b proceeds to Step S3. In Step S3, location information providing unit 40b designates the identification information on cellular telephone 30 and requests the location information on cellular telephone 30 from measuring center 50. As measuring center 50 receives the request, it refers to sector ID table 50c with the identification information on the designated cellular telephone 30 as the search key, and reads out the sector ID, which is the location information on cellular telephone 30 and provides the sector ID to location information providing unit 40b. Thus, location information providing unit 40b obtains the sector ID as the location information on cellular telephone 30.

Then the process of location information providing unit 40b proceeds 5 to Step S4. In Step S4, location information providing unit 40b designates the sector ID obtained in Step S3 and the identification information on IP server 80B, and requests location information converting device 60 to convert the location information. As location information converting device 60 receives the request, it refers to conversion table 60c for mobile packet communication network 32 shown in FIG. 6, with the designated sector ID and the identification information on IP server 80B as search keys. By this process, location information providing unit 40*b* reads out the location information IP server 80B can deal with which is in an expression format of province and corresponds to the sector ID, and provides the province to location information providing unit 40*b*.

Then the process of location information providing unit 40*b* proceeds to Step S5, and obtains the location information on cellular telephone 30, which was converted into the expression format of a province from location information converting device 60.

Further, the process of location information providing unit 40*b* proceeds to Step S6, and transmits the location information on cellular telephone 30, which was converted into the expression format of a province to Internet 70 by designating the identification information on IP server 80B as the address.

By this process, IP server 80 will be able to obtain the location information on cellular telephone 30 in the expression format of a province, which the unit can deal with.

On the other hand, in the above example, if the location information on cellular telephone 30 were to be notified to IP server 80A, the result in Step S2 would be a "yes", as IP server 80A is listed in the table of objects for providing latitude and longitude. In this case, the process of location information providing unit 40*b* proceeds to Step S7. In Step S7, location information providing unit 40C, by designating the identification information on cellular telephone 30, requests GPS correcting unit 50*d* of measuring center 50 the latitude-longitude information on cellular telephone 30. Having received the request, GPS correcting unit 50*d* refers to latitude-longitude table 50*e* with the designated identification information on cellular telephone 30 as the search key, and reads out the latitude-longitude information as the location information on cellular telephone 30. The latitude-longitude information is then provided to location information providing unit 40*b*. As location information providing unit 40*b* obtains the latitude-longitude information as location information on cellular telephone 30, it proceeds to Step S6 and transmits the obtained latitude-longitude information to IP server 80A.

Also, in the above explanation of the operations, the example is when the location information on cellular telephone 30 is notified to IP server 80B or 80A, but even if the main unit which requests the location information is a different computer, or the cellular telephone whose location information is requested belongs to a different network, the only difference is that the table to be referred to would be the one which corresponds to the required expression format, but the basic operations would be the same. However, if location information (latitude-longitude information) is requested from a computer which is an object for providing latitude and longitude, the latitude-longitude information on the cellular telephone can not be obtained by referring to the above mentioned latitude-longitude table 50*e* if the cellular telephone does not have a GPS receiver installed; and the requested latitude-longitude information can not be provided. The matter is then notified as an error to the computer, which requested the information.

As described above, according to the first embodiment of the present invention, even if the expression format of the location information is different on account of the network to which the cellular telephone belongs, and the expression format of the computer which requests the location information on the cellular telephone is different; all of the computers can obtain the required location information without the differences in expression formats posing a problem. In other words, by providing a common platform for notifying location information it becomes possible to communicate between various networks.

[1.1.3] Modification Examples of the First Embodiment

As already explained, the present invention is not limited to the above-mentioned embodiment, and several types of modifications are possible. In the first embodiment, for instance, modifications are possible as follows.

(1) Configurations of the Network

Configurations of the network are not limited to what is shown in FIG. 1. For instance, mobile communication networks are not limited to networks 12, 22 and 32, and it is possible to eliminate any one of them or add other networks.

For instance, the above mentioned mobile packet communication network 32 can be a fixed communication network, and cellular telephone 30 can be a fixed communication terminal or a portable communication terminal which is connected to the fixed communication network.

Also, for instance, the network to which computers such as IP servers 80A or 80B are connected are not limited to the internet, but can be connected to other networks such as the intranet, or an exclusive line.

Furthermore, configurations of the node on the network are not 19 limited to gateway server 40, measuring center 50, location information converting device 60 and so forth, and these functions can be allocated to any node. For instance, gateway 40 can contain all of the functions of nodes 40 to 60, or location information providing unit 40*b* can be composed as a separate node. Also, measuring center 50 can notify the location information on each of the cellular telephones 10 to 30 to these cellular telephones 10 to 30. Each of the cellular telephone 10 to 30 can function as location information providing unit 40*c* of gateway server 40, or location information converting device 60.

(2) In the embodiment, if a cellular telephone in which a GPS receiver is not installed receives a location information (latitude-longitude information) request from a computer, which is an object for providing latitude and longitude, an error notice stating that latitude-longitude information can not be provided is transmitted to the computer from which this request comes.

But it does not have to be limited to this embodiment. If latitude-longitude information can not be obtained by GPS, the latitude-longitude information, which can be obtained by referring to each of the tables, 50*a* to 50*c* can be provided to the above-mentioned computer.

Figure 9:
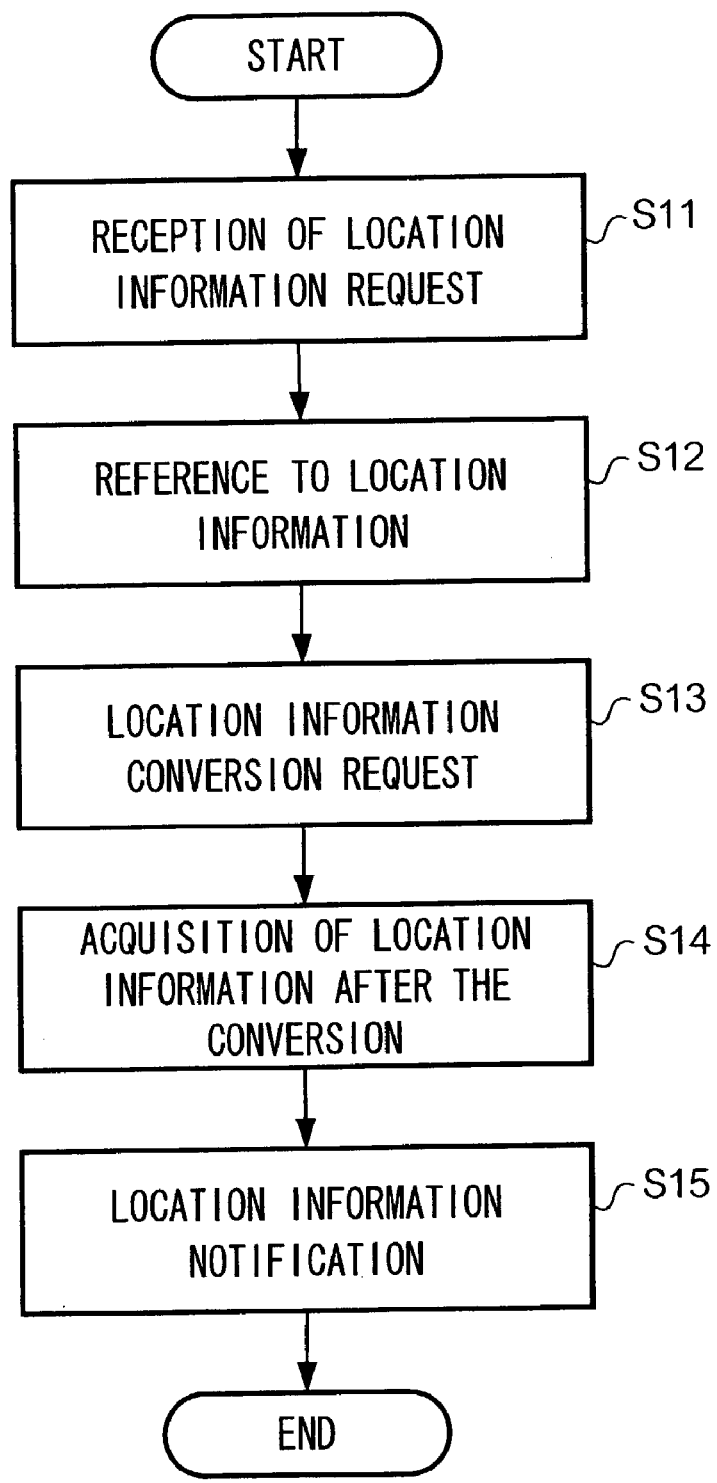
FIG. 9 is a flowchart showing the operation of the location information providing unit of the gateway server in one modification of the first embodiment.

FIG. 9 is a flowchart showing the operation of location information providing unit 40*b* of gateway server 40 in the above-mentioned embodiment. The flowchart shows an example of notifying IP server 80A, which deals with location information in the expression format of latitude-longitude, the location information on cellular telephone 20 in which a GPS receiver is not installed.

First, as a request signal to obtain the location information on cellular telephone 20 is transmitted to gateway server 40 from IP server 80A, the process of location information providing unit 40*b* proceeds to Step S11. In Step S11, the above mentioned request signal is received via data relaying unit 40*a*. In the request signal where the identification information on IP server 80A, which is the main unit of the location information request and the identification information on cellular telephone 20 whose location information is requested are contained, location information providing unit 40*b* detects the identification information contained within the request signal.

Then the process of location information providing unit 40*b* proceeds to Step S12. In Step S12, location information providing unit 40*b*, by designating the identification information on cellular telephone 20, requests measuring center 50 the location information on cellular telephone 20. As measuring center 50 receives the request for location information, it refers to area ID table 50*b* with identification information on the designated cellular telephone 20 as the search key and reads out the area ID, which is the location information on cellular telephone 20. Then the area ID is provided to location information providing unit 40*b*. Location information providing unit 40*b* obtains the area ID as location information on cellular telephone 20.

Then the process of location information providing unit 40*b* proceeds to Step S13. In Step S13, location information providing unit 40*b* designates the area ID obtained in the previous step and the identification information on IP server 80A, and requests location information converting device for a conversion of the location information. As location information converting device 60 receives the request, it refers to conversion table 60*b* for cellular telephone network 22 shown in FIG. 5 as an example with the designated area ID and the identification information on IP server 80A as search keys. The location information in the expression format of latitude-longitude compatible with IP server 80A which is correlated with the area ID is read out and provided to location information providing unit 40*b*.

Then the process of location information providing unit 40*b* proceeds to Step S14, and the location information on cellular telephone 20, which was converted into the expression format of latitude-longitude, is obtained from location information converting device 60.

Furthermore, the process of location information providing unit 40*b* proceeds to Step S15, and the location information on cellular telephone 20, which was converted into the expression format of latitude-longitude, is transmitted to Internet 70 by designating the identification information on IP server 80A as the address for transmission.

Thus, it becomes possible for IP server 80A to obtain the location information on cellular telephone 20 in which GPS receiver is not installed in the expression format of latitude-longitude, which is compatible with the unit.

(3) Configuration of Operation of Location Information Notification

In the embodiment, location information notification was carried out by the location information acquisition request received from computers such as IP server 80A or 80B, but it does not have to be limited to this mode. For instance, location information can be notified by a notice request from cellular telephone 10, 20, or 30. Or gateway server 40 can also notify location information voluntarily without any request.

(4) Objects of Location Information Notification

In the embodiment, the example described a case in which the location information on cellular telephone 10, 20 and 30 is notified to computers such as IP server 80A, 80B and so forth, which are connected to external networks such as network 12, 22 and 32. Yet it does not have to be limited to this mode, and it is also possible for cellular telephone 10, 20 and 30 to notify their location information to themselves. Moreover, the location information on cellular telephones 10, 20, and 30 can be notified to yet other cellular telephones. Furthermore, notification can be sent to any designated node within network 12, 22 and 32 instead of cellular telephones 10, 20 and 30. In other words, the expression "a designated computer" within claims is the concept containing computers such as an IP server and so forth, as well as the node within these cellular telephones or a network.

Also, IP server 80A and 80B do not necessarily have to be separate computers. In other words, while a certain computer can be equipped with the function of IP server 80A, the computer can also be equipped with the function of IP server 80B. In each of the tables of the first embodiment denoted in FIG. 4 to FIG. 7, IP server 80A and IP server 80B were separated. Likewise, the function of IP server 80A and the function of IP server 80B can be administered separately as addresses for notifying location information.

Hence, the expression "a designated computer" in claims includes the meaning of the computer, which is equipped with the function of "a plurality of computers" which can function as "the first computer" as well as "the second computer."

(5) Expression Format of Locations

The expression format of the location information which network 12, 22 and 32 obtain and the expression format of the location information which IP server 80A and 80B can deal with are not limited to the ones described in the embodiment. For instance, a location can be detected by the area code contained in a telephone number, a postal code and so forth; therefore, the location can be expressed by using these numbers.

Also, the location can be expressed by using a name of a station, a name of a bus stop or a name of a region. In the case of using a name of a station, for instance, the expression could be 1 Km west of Ginza Station of Subway Ginza Line. Also, in the case of using a bus stop, the expression could be 500 m south of Ginza 1-chome. Also, in the case of using a name of a region, the expression could be, for example, 1 Km north of Tokyo Dome or 300 m west of Yoyogi Park. Names of regions are broad concepts and may include, for instance, names given to areas such as mountains or ponds, or vernacular names besides the type of real estate mentioned above such as a building or a park.

It is also to be noted that the expression "province" as used in this embodiment does, of course, contain the "address" itself.

[1.2] Second Embodiment

Next, the second embodiment of the present invention will be explained.

In the second embodiment, when measuring center 50 can not detect the location of cellular telephone 10, 20 and 30, location information providing unit 40*b* transmits the error notice expressing this matter to IP servers 80A and 80B.

Figure 10:
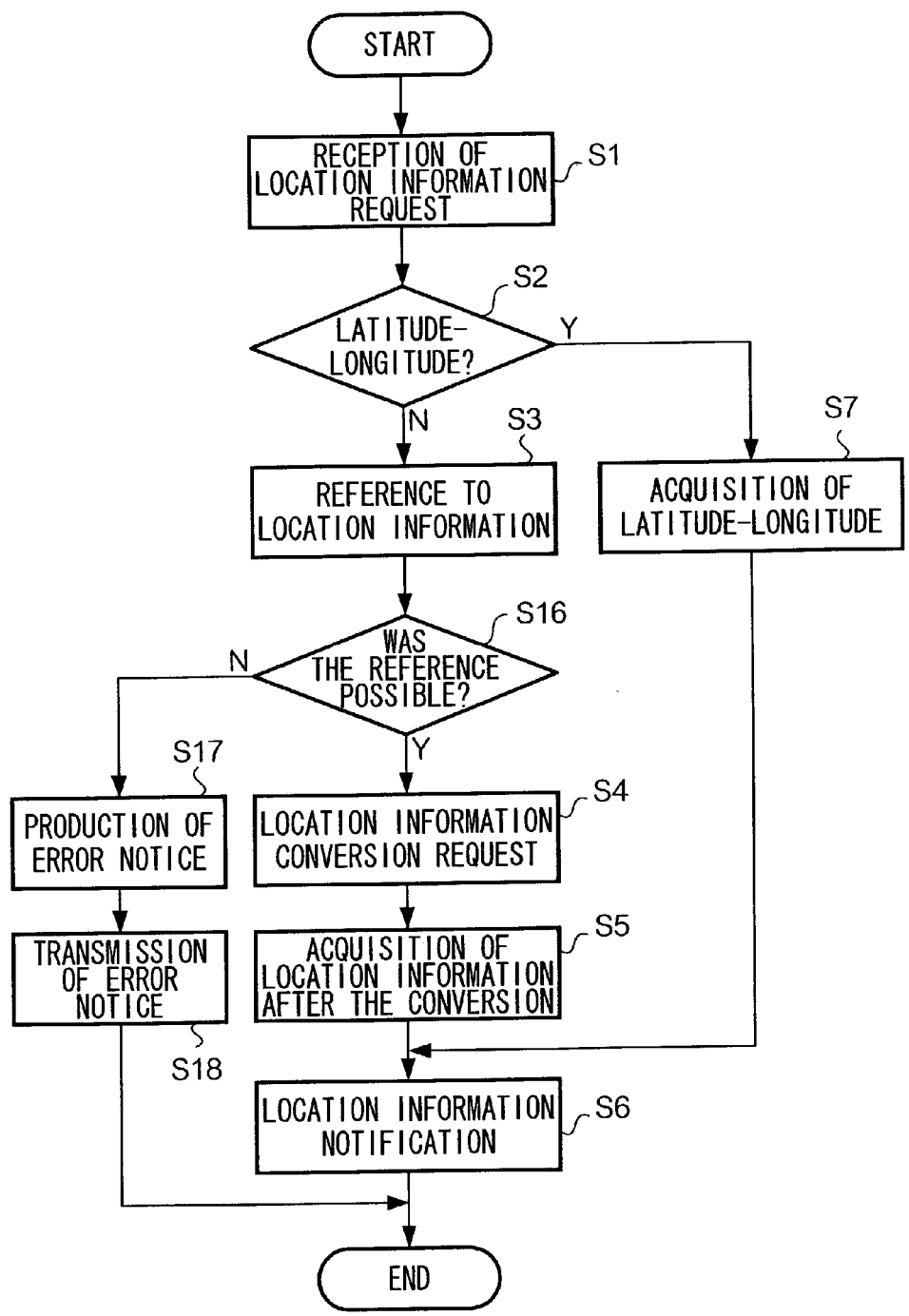
FIG. 10 is a flowchart showing the operation of the location information providing unit of the gateway server in the second embodiment.

The configuration of the second embodiment is the same as the first embodiment shown in FIG. 1 to FIG. 7, but the operation of location information providing unit is different. Specific details will be explained by referring to the flowchart shown in FIG. 10. As shown in this figure, after Step S3, location information providing unit 40*b* determines whether the location information within measuring center 50 is properly referred to (Step S16).

For instance, there are some situations when measuring center 50 can not obtain the location information on cellular telephones 10, 20, and 30 as for example, when cellular telephones 10, 20 and 30 are outside the telephone service area (out of the range) of each of the networks 12, 22 and 32, or when there is congestion on the route of transmission in each of the networks 12, 22 and 32, and when there is a lack of received information by GPS receiver 34 and so forth. In such situations, location information providing unit 40b determines that the location information was not properly referred to (Step S16; No), produces an error notice which contains reasons such as mentioned above, and notifies the IP server to which the location information is to be notified.

As mentioned above, according to the second embodiment of the present invention, in addition to the fact that providing a common platform for the above mentioned location information notification is possible; the receiver of the location information can receive the error notice containing the reason why the location information could not be produced.

Also, in this second embodiment, modification examples (1) to (5), which were mentioned in the first embodiment, can be applied.

[1.3] Third Embodiment

Next, the third embodiment of the present invention will be explained.

In the third embodiment, location information providing unit 40b periodically provides the location information on cellular telephones 10, 20, and 30 to IP servers 80A and 80B. On the other hand, IP servers 80A and 80B perform appropriate services for this type of periodical provision of location information such as chasing, car dispatch, and dynamics administration. One example of this can be installing cellular telephones 10, 20 and 30 in taxies, buses, business vehicles and so forth, and having IP servers 80A and 80B perform dynamics administration of the above mentioned vehicles by periodically receiving the locations of cellular telephones 10, 20 and 30.

[1.3.1] Configuration of the Third Embodiment

The configuration of the third embodiment is different from the first embodiment in that location information providing unit 40b is equipped with location information notification table 40c shown in FIG. 11. As shown in the figure, the identification information on the object for notifying the location information, the identification information on the main unit which requests the location information, the time to start notifying the periodical notification process of the location information, the time to stop notifying the notification process, the notification cycle showing the cycle of the notifying timing, and the notification flag for showing whether the notification process is approved are correlated with each other and stored. For instance, in the figure, the location information on cellular telephone 30 is set for being notified to IP server 80B at a frequency of every one-minute between 9:00 and 17:00. Furthermore, since the notification flag correlated with this setting is on, it means that the notification process according to this setting is approved and will be performed. The notification flag goes on and off by commands given, for instance, by the main unit of the location information request (IP server 80B) or the object for notifying the location information (cellular telephone 30). If the notification flag is off, no process correlated with that setting will be performed. Other configurations of the third embodiment are the same as the first embodiment explained in FIG. 1 to FIG. 7; therefore, explanations will be omitted.

[1.3.2] Operations of the Third Embodiment

Next, operations of the third embodiment of the above configurations will be explained.

Operations will be explained by referring to the sequence shown in FIG. 12, which is an example of notification of the location information on cellular telephone 30 to IP server 80B.

First, IP server 80B transmits the request signal for requesting the setting for periodically notifying the location information on cellular telephone 30 to gateway server 40 (Step Sa1). Within this request signal are contained, the identification information on IP server 80B which is the main unit of the location information request, the location information on cellular telephone 30 which is the object for notifying the location information, the time to start notifying the location information, the time to stop the notification process and the notification cycle showing the cycle of notification.

As location information providing unit 40b of gateway server 40 receives the above mentioned request signal via data relaying unit 40a, it detects the identification information on IP server 80B, the identification information on cellular telephone 30, the time to start notifying, the time to stop notifying and the notification cycle contained in the request signal and stores in location information notification table 40c as shown in FIG. 11 (Step Sa2). At this moment, the notification flag shown in FIG. 11 is set at off.

Then location information providing unit 40b of gateway server 40 transmits the notice of the setup termination showing that the necessary information for notifying the location information was stored in location information notification table 40c to IP server 80B (Step Sa3).

Then IP server 80B transmits the request signal for the commencement of the periodical location notification to gateway server 80B (Step Sa4).

Figure 13:
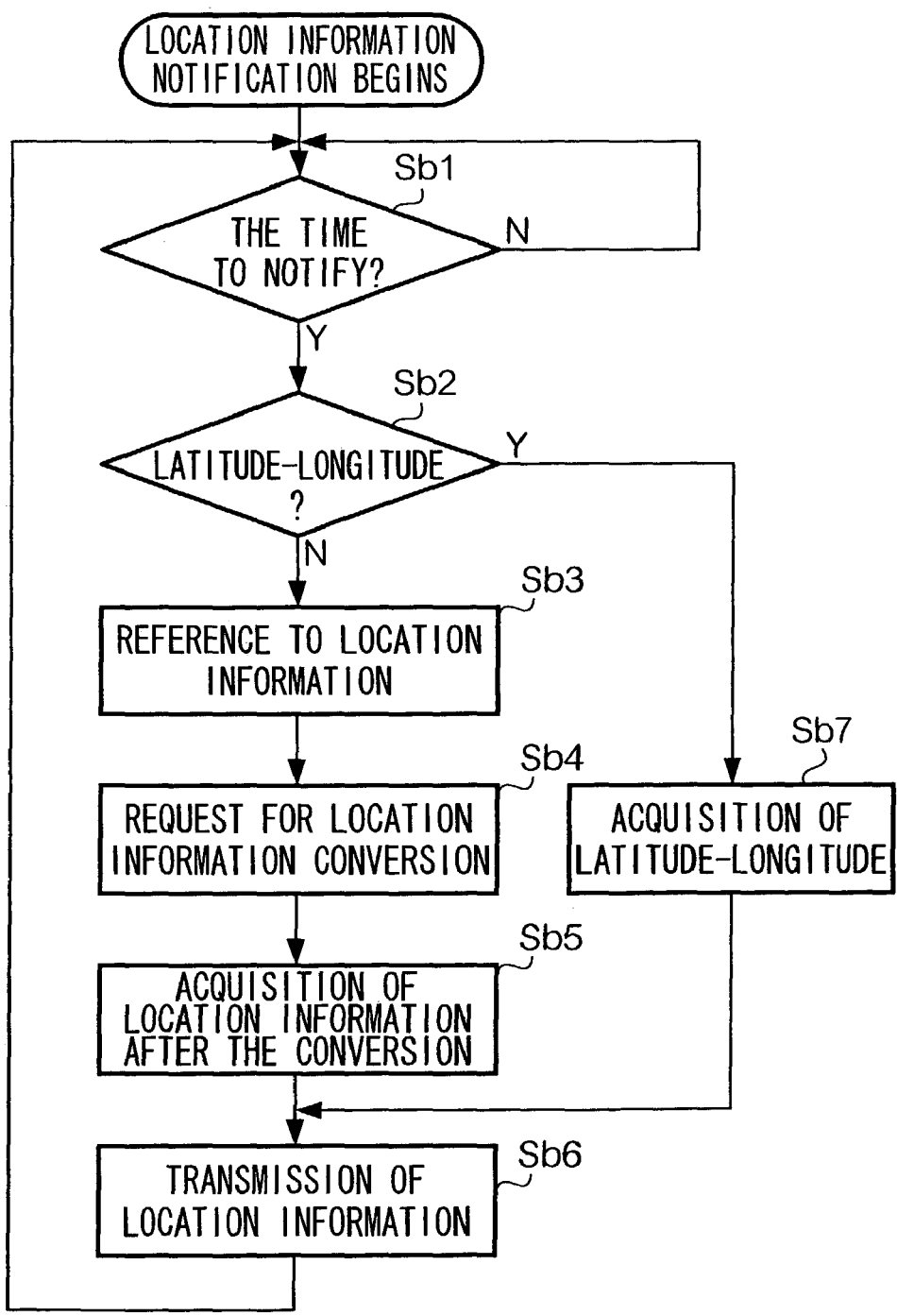
FIG. 13 is a flowchart showing the operation of the location information providing unit of the gateway server of the third embodiment.

As location information providing unit 40b of gateway server 40 receives the above mentioned request signal through data relaying unit 40a, it turns the notification flag of location information notification table 40c on and begins the periodical location notification by performing the process shown in the flowchart in FIG. 13 (Step Sa5). In other words, in FIG. 13, as location information providing unit 40b determines that the notification cycle arrived within the time to start notifying and the time to stop notifying (Step Sb1; Yes), it goes back to Step Sb1 by performing Step Sb2 to Step Sb7 which are the same as the above mentioned Step S2 to Step S7 of FIG. 8.

By the flow of the process in this manner, the location information is periodically notified from gateway server 40 to IP server 80B (Step Sa6, Sa7).

Then as IP server 80b transmits the request signal for stopping the periodical location notification to gateway server 80B (Step Sa8), location information providing unit 40b of gateway server 40 turns the notification flag of location information notification table 40c off and stops the location notification (Step Sa9).

Thus, according to the third embodiment of the present invention, notifying the location information to the computer in accordance with the setup, which was established beforehand on a periodical basis is possible.

[1.3.3] Modification Examples of Third Embodiment

Even in the third embodiment, the modification examples (1) to (5), which were mentioned in the first embodiment can be applied, as well as the following modifications are possible.

(1) Notification Embodiment of the Location Information

Figure 12:
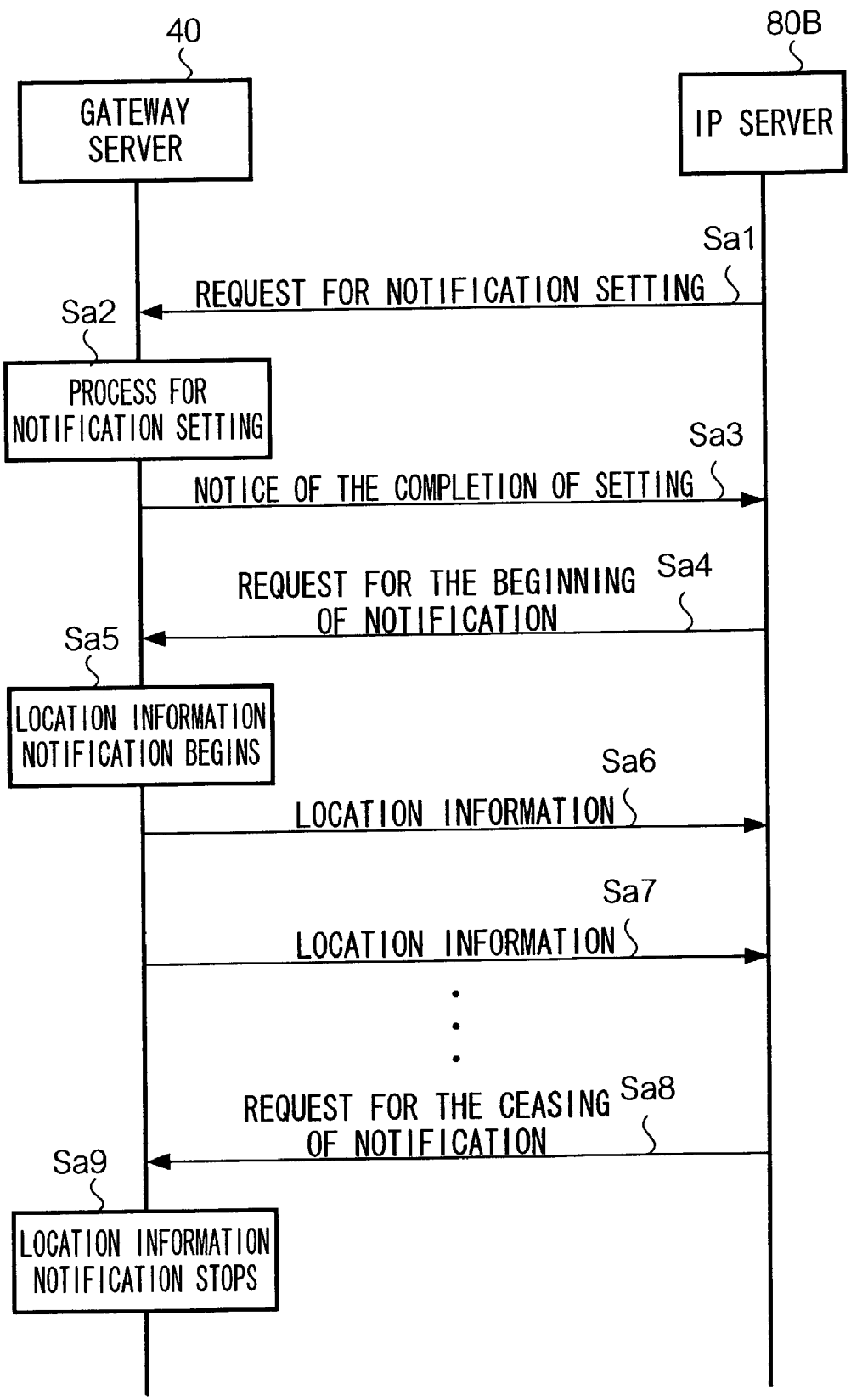
FIG. 12 is a sequence diagram showing an example of an operation of the third embodiment.
Figure 14:
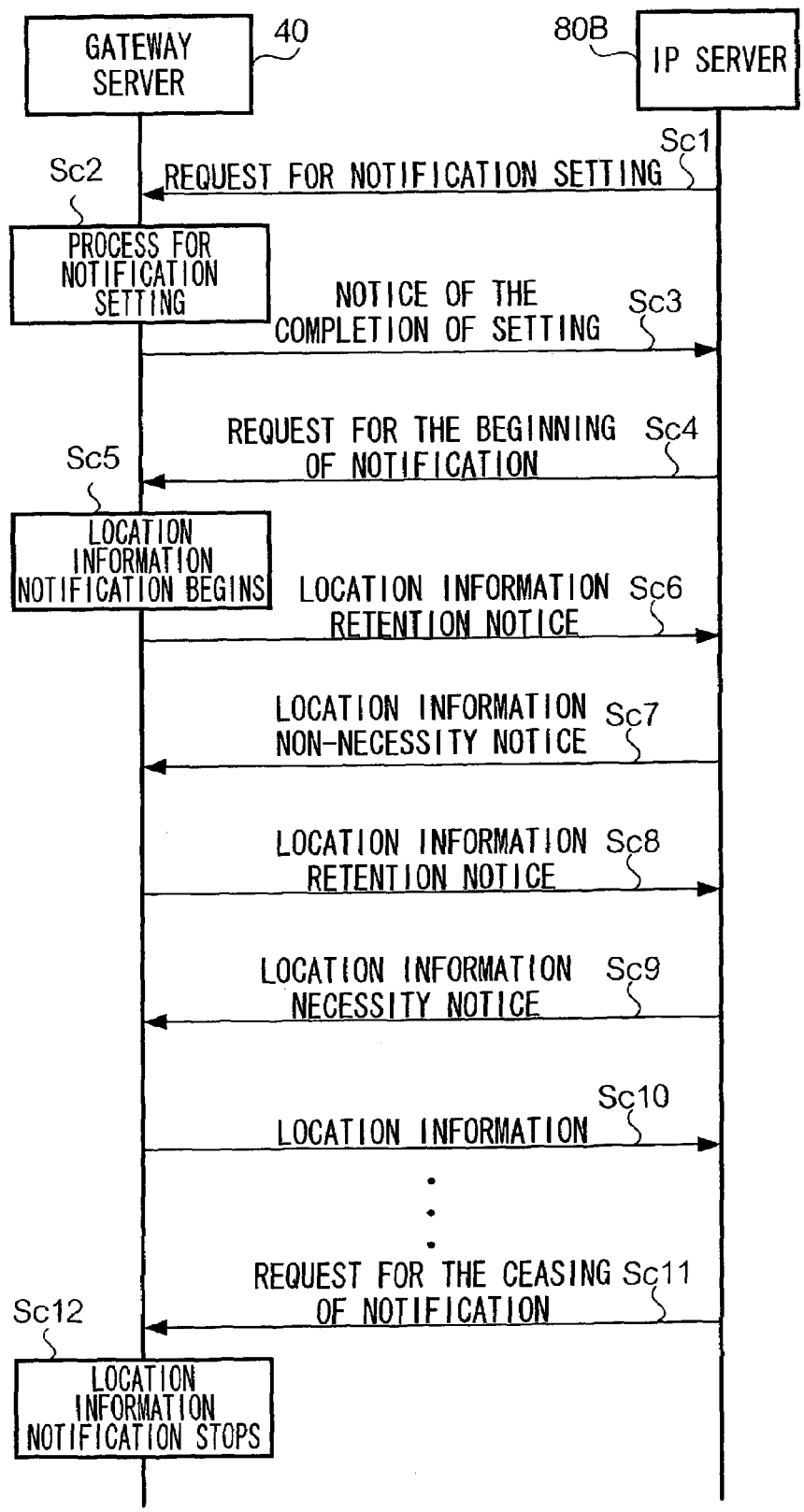
FIG. 14 is a sequence diagram showing the operation in one modification of the third embodiment.

As Step Sa6 and Sa7 shown in FIG. 12, location information providing unit 40b can notify the location information after inquiring of IP servers 80A and 80B whether location information is needed each time instead of notifying IP server 80B the location information unilaterally as the notification cycle arrives. The operation sequence of this instance is shown in FIG. 14. As shown in FIG. 14, as the notification circle arrives after the location information begins, location information providing unit 40*b* of gateway server 40 first transmits to IP server 80B the location information retention notice showing that the location information is retained (Step Sc6).

As the non-necessity notice of location information, meaning that the location information is unnecessary is transmitted from IP server 80B (Step Sc7) responding to this inquiry, location information providing unit 40*b* waits until the next notification cycle arrives.

On the other hand, as the location information necessity notice meaning that the location information is necessary is transmitted from IP server 80B responding to the location information retention notice (Step Sc9), location information providing unit 40*b* notifies IP server 80B the location information (Step Sc 10).

Figure 15:
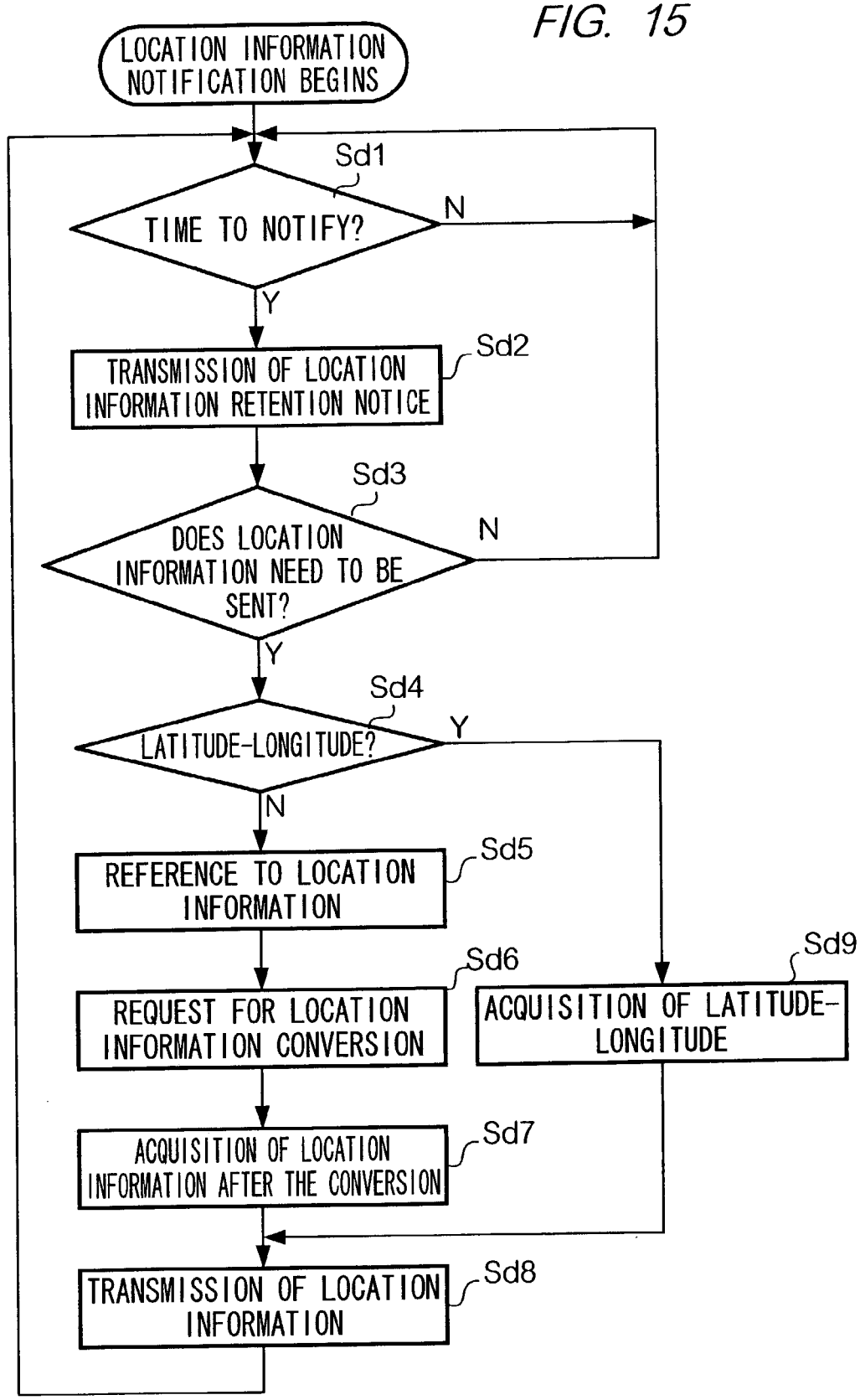
FIG. 15 is a flow chart showing the operation of the location information providing unit of the gateway server in one modification of the third embodiment.

Shown in FIG. 15 is a flowchart of the process of location information providing unit 40*b* of the above sequence.

In this figure, as the notification cycle arrives after the location information began (Step Sd1), location information providing unit 40*b* first transmits to IP server 80B the location information retention notice showing that the location information is retained (Step Sd2).

When the non-necessity notice of location information is transmitted from IP server 80B in response (Step Sd3; No), location information providing unit 40*d* goes back to Step Sd1 and waits until the next notification cycle arrives.

On the other hand, when the location information necessity notice meaning that the location information is necessary is transmitted from IP server 80B responding to the location information retention notice (Step Sd3; Yes), location information providing unit 40*b* notifies IP server 80B the location information according to the same flow as Step Sb2 to Sb7 of FIG. 13 (Step Sd4 to Sd9).

Reduction in the traffic can be expected since unnecessary location information is not transmitted on the network in this manner.

(2) Main Unit of Notification Setup

In the third embodiment, as shown in FIG. 12, IP server 80B asked gateway server 40 for the notification setup. But providing the notification setup is not limited to gateway server 40, and cellular telephones 10, 20, and 30, which are the objects of notifying location information can perform the above mentioned notification setup.

Figure 16:
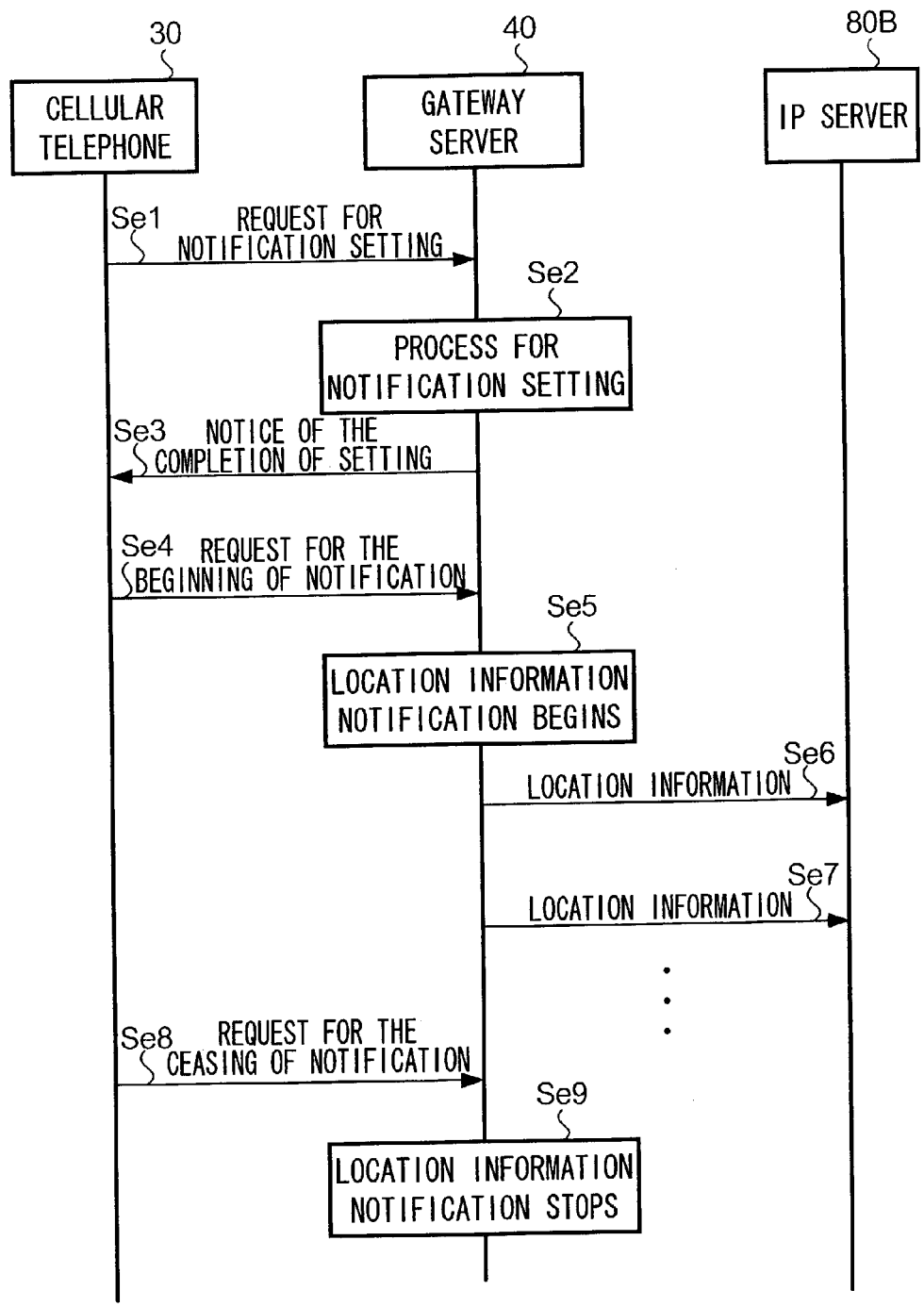
FIG. 16 is a sequence diagram showing the operation in one modification of the third embodiment.

In other words, as shown in the sequence of FIG. 16, for instance, cellular telephone 30 can transmit the request signal to request the periodical provision of the location information on its own to gateway server 40 (Step Se1). In the request signal, as mentioned above, are contained the identification information on IP server 80B which is the main unit of the location information request, the identification information on cellular telephone 30 which is the object of notifying the location information, the time to start notifying the location information, the time to stop notification and the notification cycle showing the cycle of notification.

As location information providing unit 40*b* of gateway server 40 receives the above mentioned request signal via data relaying unit 40*a*, it detects the identification information on IP server 80B, the identification information on cellular telephone 30, the time to start notifying, the time to stop notifying, and the notification cycle contained within the request signal, and stores the information in location information notification table 40*c* (Step Se2). Then the rest of the process is performed according to the same flow as in FIG. 12.

[1.4] Fourth Embodiment

Next, the fourth embodiment of the present invention will be explained.

In the fourth embodiment, location information providing unit 40*b* transmits converted location information simultaneously to a plurality of IP servers 80A and 80B. On the other hand, IP servers 80A and 80B perform services appropriate to this type of simultaneous transmission of location information. One example of this is, a service such as a search game in which the locations of cellular telephones 10, 20, and 30 are searched. In other words, searched objects such as entertaining idols and so forth carry cellular telephones, and each different searcher operates IP servers 80A and 80B. A plurality of searchers who operate IP servers 80A and 80B can compete in the location search of searched objects by obtaining the location of cellular telephones by simultaneous transmission in this manner.

In this example, if the cellular telephones are the ones in which the searchers retain the destination to which the location information is notified, it becomes more stimulating since search can be performed by receiving the location notice.

The configurations of the fourth embodiment are the same as that of the first embodiment shown in FIG. 1 to FIG. 7; therefore, explanations are omitted.

Figure 17:
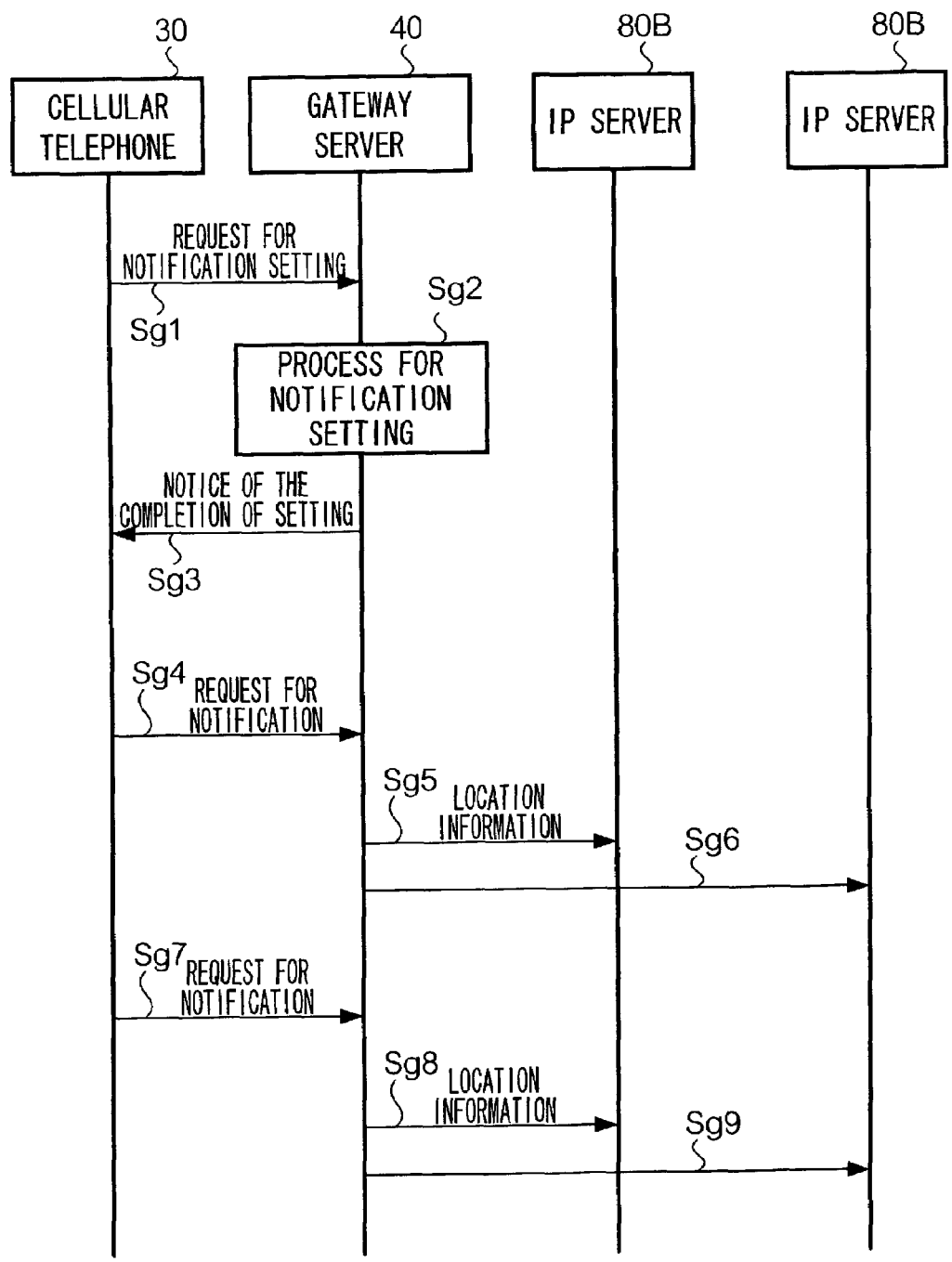
FIG. 17 is a sequence diagram showing an example of an operation in the fourth embodiment.

Shown in FIG. 17 is the operation sequence of the fourth embodiment.

Hereafter, by referring to this sequence, operations will be explained with the example of a situation in which the location information on cellular telephone 30 is simultaneously transmitted to IP servers 80A and 80B.

First, cellular telephone 30 transmits the request signal to gateway server 40 for requesting the simultaneous transmission of the location information on cellular telephone 30 to IP servers 80A and 80B (Step Sg1). In the request signal are contained the identification information on IP server 80A and 80B which are the main units receiving the location information, and the identification information on cellular telephone 30 which is the object of notifying the location information.

As location information providing unit 40*b* of gateway server 40 receives the above mentioned request signal via data relaying unit 40*a*, it detects, and stores the identification information on IP servers 80A and 80B and the identification information on cellular telephone 30 contained within the request signal (Step Sg2).

Then location information providing unit 40*b* of gateway server 40 transmits to cellular telephone 30 the setup completion notice showing that the necessary information for simultaneous transmission of the location information was stored (Step Sg3).

Then cellular telephone 30 transmits the request signal for notice for requesting the location notice to gateway server 40 (Step Sg4).

As location information providing unit 40*b* of gateway server 40 receives the above mentioned request signal via data relaying unit 40*a*, it performs the operations shown in the above-mentioned flowchart in FIG. 8 and transmits the location information on cellular telephone 30 to IP servers 80A and 80B (Step Sg5, Sg6). In other words, in FIG. 8, location information providing unit 40*b* transmits the location information on cellular telephone 30 as the identification information on IP servers 80A and 80B being the destinations to which the location information is notified.

Thus, according to the fourth embodiment of the present invention, it becomes possible to simultaneously transmit the location information to a plurality of computers such as IP servers 80A and 80B or cellular telephones 10, 20 and 30 in accordance with the setup established beforehand.

Also in the fourth embodiment, modification examples (1) to (5) mentioned in the first embodiment, and modification examples (1) and (2) mentioned in the third embodiment can be applied. Also, simultaneous notification process can be performed periodically as in the third embodiment.

[1.5]

Next, the fifth embodiment of the present invention will be explained.

In the fifth embodiment, the main unit performing the notification setup of the location information and the main unit receiving the location information are different IP servers.

The configurations of the fifth embodiment are the same as the first embodiment shown in FIG. 1 to FIG. 7; therefore, explanations will be omitted.

Figure 18:
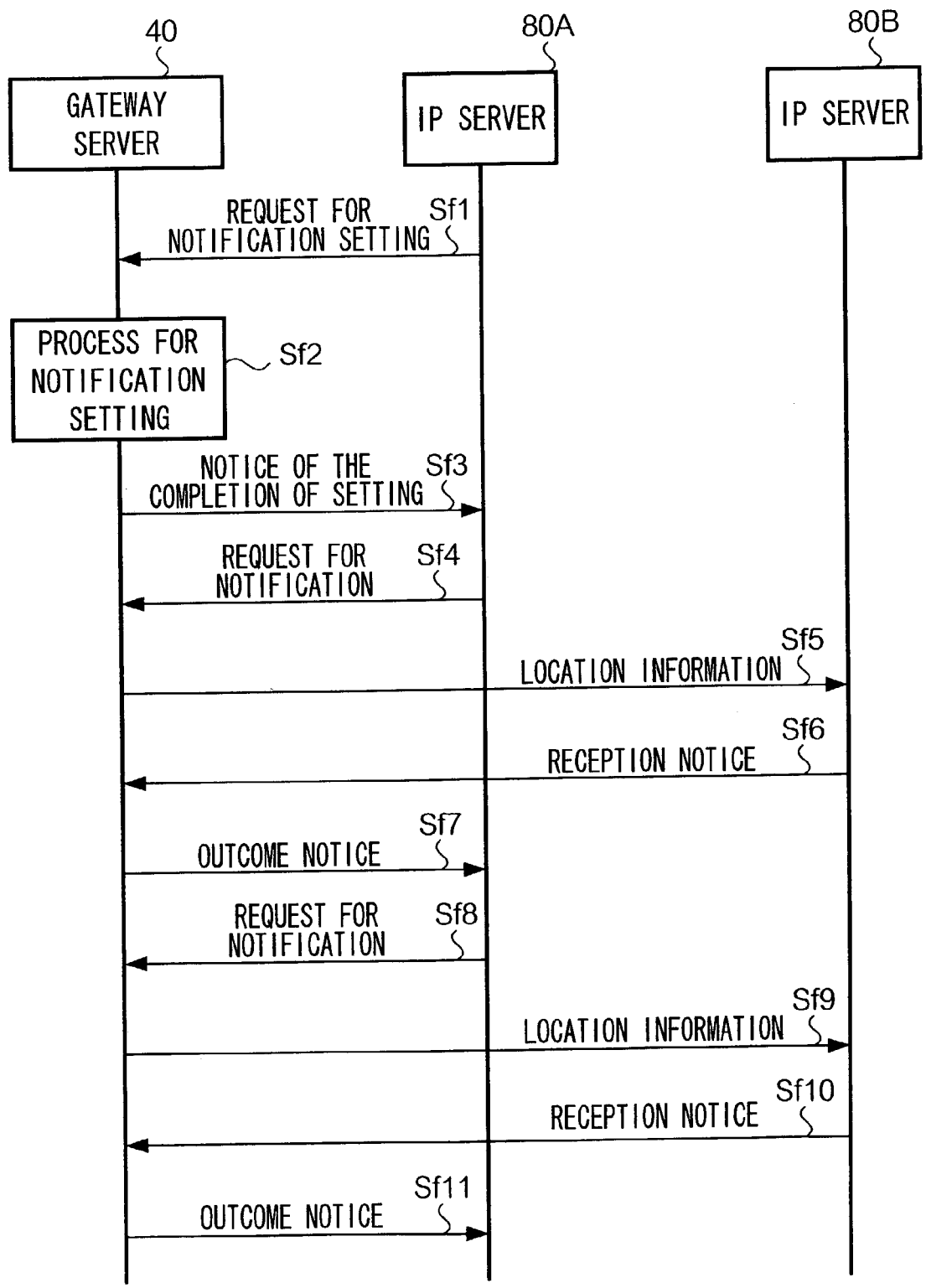
FIG. 18 is a sequence diagram showing an example of an operation in the fifth embodiment.

Shown in FIG. 18 is the operation sequence of the fifth embodiment.

Hereafter, by referring to this sequence, operations will be explained with the example of a case in which IP server 80A requests the notification setup regarding the location information on cellular telephone 30, and IP server 80B receives this location information.

First, IP server 80A transmits the request signal for requesting gateway server 40 to notify the location information on cellular telephone 30 to IP server 80B (Step Sf1). In the request signal, are contained the identification information on IP server 80B which is the destination of the location information and the identification information on cellular telephone 30 which is the object of notifying the location information.

As location information providing unit 40*b* of gateway server 40 receives the above mentioned request signal via data relaying unit 40*a*, it detects, and stores the identification information on IP server 80B and the identification information on cellular telephone 30 contained within the request signal (Step Sf2).

Then location information providing unit 40*b* of gateway server 40 transmits to IP server 80B the setup completion notice showing that the necessary information for simultaneous transmission of the location information has been stored (Step Sf3).

Then, cellular telephone 30 transmits the request signal for notice for requesting the location notice to gateway server 40 (Step Sf4).

As location information providing unit 40*b* of gateway server 40 receives the above mentioned request signal via data relaying unit 40*a*, it performs the operation shown in the flowchart in FIG. 8 and transmits the location information on cellular telephone 30 to IP server 80B (Step Sf5).

On the other hand, as IP server 80B receives the location information, it transmits the reception notice to gateway server 40 (Step Sf6).

As location information providing unit 40*b* of gateway server 40 receives the above mentioned reception notice, it transmits the outcome notice meaning that the location information was properly transmitted to IP server 80A (Step Sf7). Hereafter, the above-mentioned Step Sf4 to Sf7 will be repeated.

By the fifth embodiment of the present invention, even if notification setup of the location information and the destination of the location information are different, the location information can be notified.

Also, in the fifth embodiment, modification examples (1) to (5) which were mentioned in the first embodiment and the modification examples (1) and (2) which were mentioned in the third embodiment can be applied.

[1.6] Sixth Embodiment

Next, the sixth embodiment of the present invention will be explained.

In the sixth embodiment, for instance, the location information which is once received by computers such as IP server 80A and so forth, will be forwarded to another computer for example, IP server 80B.

The configurations of the sixth embodiment are the same as the first embodiment shown in FIG. 1 to FIG. 7; therefore, explanations are omitted.

Shown in FIG. 19 is the operation sequence of the sixth embodiment.

Hereafter, by referring to this sequence, the operations will be explained with an example of a situation in which the location information on cellular telephone 30 notified from gateway server 40 to IP server 80A is forwarded to IP server 80B.

First, IP server 80A transmits a request signal for requesting the location information on cellular telephone 30 to gateway server 40 (Step Sh1). In the request signal are contained, the identification information on IP server 80A which is the main unit requesting the location information and the identification information on cellular telephone 30 which is the object of notifying the location information.

As location information providing unit 40*b* of gateway server 40 receives the above mentioned request signal via data relaying unit 40*a*, it performs the operations shown in the flowchart in the above mentioned FIG. 8 to obtain the location information on cellular telephone 30 (Step Sh2), and forwards this to IP server 80A (Step Sh3).

On the other hand, IP server 80A, after receiving the location information, transmits the request signal for forwarding the location information to IP server 80B (Step Sh4). In the request signal is contained the identification information on IP server 80A which is the origin of the location information from where it is forwarded, the identification information on IP server 80B which is the destination the location information is forwarded to, and the identification information on cellular telephone 30 which is the object of the location information; and the location information.

As location information providing unit 40*b* of gateway server 40 receives the above mentioned request signal via data relaying unit 40*a*, it performs Steps S2 to S6 shown in FIG. 8; converts the expression format of the location information contained in the above request signal from the one IP server 80A can deal with to the one IP server 80B can deal with (Step Sh5), and sends the location information to IP server 80B (Step Sh6).

Even in the sixth embodiment, the modification examples (1) to (5) mentioned in the first embodiment and modification examples (1) and (2) mentioned in the third embodiment can be applied. According to the sixth embodiment of the present invention, the location information can be forwarded in the expression format that the computer which is the main unit obtaining the location information can deal with.

[2] Effects of Embodiments

As explained above, according to the present invention, the location information on mobile communication terminals which is produced in various expression formats can be provided in the expression format compatible with the computer which uses the location information; hence, a computer on a network can obtain the location information on mobile communication terminals without the difference in expression formats posing a problem, and a common platform for location information provision correlated with the integration of the network can be provided (claim 1 to 56).

Also, according to the present invention, with regard to expression formats that computers can deal with, any one of the following formats expressed by the latitude and the longitude, the format expressed by the address or the province, the format expressed by a Zip code, the format expressed by a telephone number, the format expressed by a station name, the format expressed by the name of a bus stop or the format expressed by a regional name can be used (claims 1 to 4, claims 29 to 32).

Also, according to the present invention, when the location information can not be produced, an error notice stating that the location information can not be produced is notified to the computer, and by the error notification the computer can confirm that the location information on the mobile communication terminal can not be produced (claim 5 to 7, claim 33 to 35).

Also, according to the present invention, notifying the location information on a periodical basis to the computer is possible (claim 8 to 16, claim 36 to 44).

Also, according to the present invention, transmitting the location information simultaneously to a plurality of computers is possible (claim 17 to 20, claim 45 to 48).

Also, according to the present invention, notifying the location information to another computer by request of one computer is possible (claim 21 to 25, claim 49 to 53).

Also, according to the present invention, forwarding the location information from one computer to another computer is possible (claim 26 to 28, claim 54 to 56).

The invention claimed is:

1. A method for notifying a location of a mobile terminal in a form of preference, comprising:
    providing at least one table that stores location indicia and corresponding geographical addresses, wherein each of the corresponding geographical addresses is stored in at least one form of preference;
    receiving a request to notify a geographic location of a mobile terminal to at least one communication node;
    obtaining a location indicium indicative of the geographical location of the mobile terminal;
    converting the location indicium, using the at least one table, into a corresponding geographical address of a form preferred by a respective one of the at least one communication node; and
    notifying each of the at least one communication node of the corresponding geographical address in the respective preference form.

2. A method according to claim 1, wherein location indicia are any of base station IDs, area IDs and sector IDs.

3. A method according to claim 2, wherein a base station ID is used in a cellular telephone network to identify a location of a PHS terminal, an area ID is used in a cellular telephone network to identify a location of a PDC terminal and a sector ID is used in a mobile packet communication network to identify a location of a cellular terminal.

4. A method according to claim 1, wherein providing at least one table comprises providing tables for respective mobile communication networks.

5. A method according to claim 1, wherein the at least one form of preference is any of a latitude-longitude, a postal address, an indication of a province, a Zip code, a telephone area code, a name of a station, a name of a bus stop and a name of a region.

6. A method according to claim 1, wherein the at least one table stores the corresponding geographical addresses each in a form preferred by a respective one of the at least one communication node.

7. A method according to claim 1, wherein receiving a request comprises receiving a request from one of the at least one communication node.

8. A method according to claim 1, wherein receiving a request comprising receiving a request from the mobile terminal.

9. A method according to claim 1, further comprising returning an error if the location indicium is not convertible into a corresponding geographical address in the form preferred by any one of the at least one communication node.

10. A method according to claim 1, further comprising updating and notifying the corresponding geographical address at intervals.

11. A method according to claim 10, wherein updating comprising updating on a predetermined schedule.

12. A method according to claim 10, wherein updating the corresponding geographical address comprises halting updating at a request.

13. A location information management system which notifies a location of a mobile terminal in a form of preference, comprising:
    at least one table that stores location indicia and corresponding geographical addresses, wherein each of the corresponding geographical addresses is stored in at least one form of preference;
    a receiver configured to receive a request to notify a geographic location of a mobile terminal to at least one communication node;
    a locator configured to obtain a location indicium indicative of the geographical location of the mobile terminal;
    a converter configured to convert the location indicium, using the at least one table, into a corresponding geographical address of a form preferred by a respective one of the at least one communication node; and
    a transmitter configured to notify each of the at least one communication node of the corresponding geographical address in the respective preference form.

14. A system according to claim 13, wherein location indicia are any of base station IDs, area IDs and sector IDs.

15. A system according to claim 14, wherein a base station ID is used in a cellular telephone network to identify a location of a PHS terminal, an area ID is used in a cellular telephone network to identify a location of a PDC terminal and a sector ID is used in a mobile packet communication network to identify a location of a cellular terminal.

16. A system according to claim 13, wherein the at least one table comprises tables for respective mobile communication networks.

17. A system according to claim 13, wherein the at least one form of preference is any of a latitude-longitude, a postal address, an indication of a province, a Zip code, a telephone area code, a name of a station, a name of a bus stop and a name of a region.

18. A system according to claim 13, wherein the at least one table stores the corresponding geographical addresses each in a form preferred by a respective one of the at least one communication node.

19. A system according to claim 13, wherein the receiver receives the request from one of the at least one communication node.

20. A system according to claim 13, wherein the receiver receives the request from the mobile terminal.

21. A system according to claim 13, wherein the transmitter returns an error if the location indicium is not convertible into a corresponding geographical address in the form preferred by any one of the at least one communication node.

22. A system according to claim 13, further comprising a location update control configured to control the locator, converter and the transmitter to update and notify the corresponding geographical address at intervals.

23. A system according to claim 22, wherein the location update control updates and notifies the corresponding geographical address on a predetermined schedule.

24. A method according to claim 22, wherein the location update control halts updating at a request.

25. A method according to claim 1, wherein each of the corresponding geographical addresses is stored in more than one form of preference.

26. A system according to claim 13, wherein each of the corresponding geographical addresses is stored in more than one form of preference.

27. A method according to claim 7, wherein converting the location indicium into a corresponding geographical address of a form preferred by a respective one of the at least one communication node comprises converting the location indicium into a corresponding geographical address of a form stored as preferred by the one of the at least one communication node.

28. A system according to claim 19, wherein the converter configured to convert the location indicium into a corresponding geographical address of a form stored as preferred by the one of the at least one communication node.

29. A method according to claim 1, wherein the at least one form of preference is a form selected from the group consisting of a postal address, a ZIP code and a telephone area code.

30. A system according to claim 13, wherein the at least one form of preference is a form selected from the group consisting of a postal address, a ZIP code and a telephone area code.

* * * * *

UNITED STATES PATENT AND TRADEMARK OFFICE
CERTIFICATE OF CORRECTION

PATENT NO. : 7,430,422 B2 Page 1 of 1
APPLICATION NO. : 10/296293
DATED : September 30, 2008
INVENTOR(S) : Junko Nagatsuma et al.

It is certified that error appears in the above-identified patent and that said Letters Patent is hereby corrected as shown below:

On the Title Page

Item (75), after "Tanibayashi," delete "Fujisawa" and substitute --Kanagawa-- in its place.

Item (75), after "Kosuge," delete "Yokohama" and substitute --Kanagawa-- in its place.

Item (75), after "Murata," delete "Kunitachi" and substitute --Tokyo-- in its place.

In the Claims

In column 20, claim 5, line 6, after "of a province, a" delete "Zip" and substitute --ZIP-- in its place.

In column 20, claim 17, line 63, after "of a province, a" delete "Zip" and substitute --ZIP-- in its place.

Signed and Sealed this

Second Day of June, 2009

JOHN DOLL
*Acting Director of the United States Patent and Trademark Office*